Figure 1:
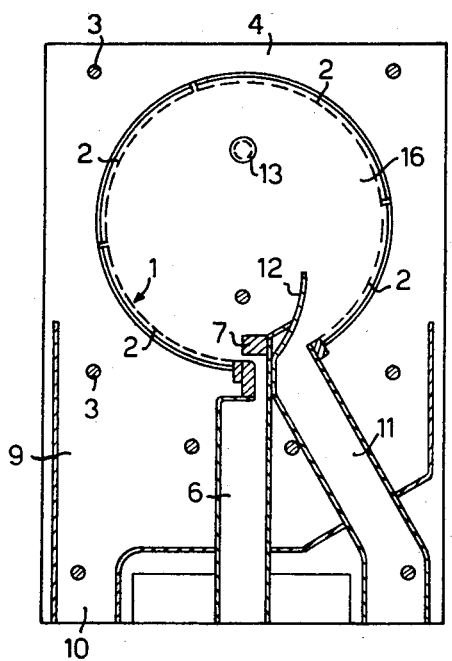

Dec. 15, 1959   F. J. FONTEIN   2,917,174
SCREENING APPARATUS
Filed March 23, 1956

Inventor
Freerk J. Fontein
By Cushman, Darby & Cushman
Attorneys 2,917,174
Patented Dec. 15, 1959

2,917,174
SCREENING APPARATUS

Freerk J. Fontein, Heerlen, Netherlands, assignor to Stamicarbon N.V., Heerlen, Netherlands Application March 23, 1956, Serial No. 573,426

Claims priority, application Netherlands March 25, 1955

4 Claims. (Cl. 209—273)

The present invention relates to particle separation and more particularly to improvements in screening apparatus of the type having a cylindrically-bent screening deck mounted between two side plates, a feed conduit to supply liquid and particles to be separated tangentially to the concave side of the screening deck and devices for the discharge of the separated fractions, as described in my copending application Serial No. 475,251, filed December 14, 1954.

Apparatus such as disclosed in the aforesaid application increase in capacity, that is, in the amount of material discharged through the screening deck per unit time, as the radius of curvature decreases and the length of the deck increases. Where a collecting vessel is employed to receive the coarse fraction discharge as disclosed in my above-identified application, the maximum length of the deck for a given radius is restricted to an arc of approximately 270°.

Accordingly, it is an object of the present invention to provide a screening apparatus of the type described in which the coarse fraction discharge receiving means is arranged so that the length of the screening deck can be extended to a maximum arcuate distance to thereby increase the capacity of the apparatus.

With the present arrangement, the arc formed by the screening deck and hence the length of the screening deck at a given radius is as large as possible, so that the capacity is maximal for a screening apparatus of a given size. The arc formed by the deck in the apparatus according to the invention may be as much as about 330°. It has been found, however, that when the fraction running over the screening deck flows into the discharging means at a rather high velocity, the means may act as an ejector and create a partial vacuum in the space enclosed by the screening deck. This will adversely affect the discharge of liquid and fine particles through the apertures in the screening deck.

Consequently, it is another object of the present invention to provide an increased capacity screening apparatus of the type described having improved means to prevent the creation of a partial vacuum in the space enclosed by the screening deck so as to permit efficient separation therethrough.

A further object of the present invention is the provision of a screening apparatus of the type described which is compact in construction, efficient in operation, and economical to manufacture and maintain.

These and other objects of the present invention will become more apparent during the course of the following detailed description and appended claims.

The invention may best be understood with reference to the accompanying drawings wherein an illustrative embodiment is shown.

Figure 2:
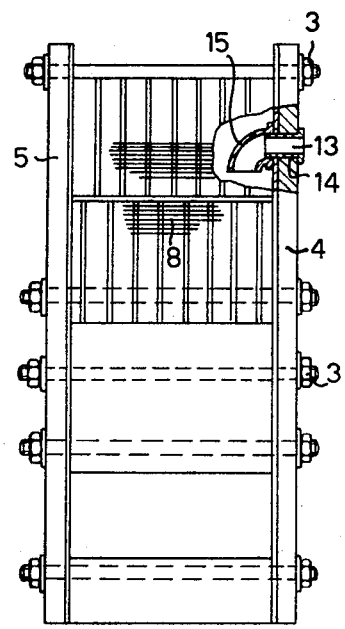

In the drawings:

Figure 1 is a longitudinal seciional view of a screening apparatus embodying the principles of the present invention; and Figure 2 is a side elevational view of the apparatus with parts broken away.

Referring now more particularly to the drawings, the apparatus includes a separating body or screening deck 1 which may be made up of four screen segments 2, bent along a circular radius of curvature. The screen segments are clamped between opposed side plates 4 and 5 by any suitable means, such as bolts 3. The material to be screened is supplied under pressure through a conduit 6 which is provided at its discharge end with a nozzle 7 set at a tangent to the inner concave surface of the screening deck. The liquid and the fine particles pass through slits or spaces provided between a series of screen bars 8 which make up the screen segments. The fine fraction then enters a collecting vessel 9, from which it is discharged through a conduit 10.

The four screen segments 2 comprise an angle of about 330° and, as shown, have a radius of curvature of 140 mm. At the end of the screening deck a conduit 11 adjoins the feed conduit 6. The coarse fraction left behind on the screening deck is removed through this conduit. Between the conduits 6 and 11 a partition 12 is mounted which conducts the fraction running from the end of the screening deck into the conduit 11.

The side plate 4 has an opening 13 formed therein through which a sleeve 14 extends and a bent pipe section 15 is screwed onto the inner end of the sleeve. In this way the space 16 enclosed by the screening deck is connected to the space outside the screening deck, so that in the space 16 a partial vacuum cannot occur.

It can thus be seen that there has been provided a screening apparatus in which the screening deck is extended to a maximum length for a given radius of curvature. As noted above, this increase in screening deck length effects an increase in capacity. That is, the amount of material discharging through the screening deck per unit time is increased. This increase in capacity results from the novel construction and arrangement of the coarse fraction discharging device. The provision of the opening 13 in the side plate 4 insures that no partial vacuum can build up in the interior space of the screening deck as a result of the action of the coarse fraction discharging device. The provision of the partition 12 insures a complete collection of coarse fraction and prevents any portion of the latter from becoming commingled with the supply.

It will be understood that the screening deck may be constructed in any suitable manner, for example, as taught in my aforesaid application.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus for separating particles according to size comprising a separating body having a feed end, an adjacent discharge end, and a separating surface extending therebetween and having a plurality of transversely elongated separating apertures therein, said separating surface defining a segment of a cylinder of an arcuate extent greater than 270° generated by moving a line parallel to itself so that a given point on said line moves in a plane perpendicular thereto, said separating body being fixedly mounted with a 180° concave segment of said separating surface facing downwardly, means for supplying particles to be separated and a suspending liquid tangentially to said separating surface at said feed end in a direction substantially perpendicular to the generating line of said separating surface and at a velocity sufficient to cause an oversize fraction to travel along said separating surface to the discharge end thereof, means for discharging the fine fraction issuing through said separating body, and means disposed adjacent said supplying means for collecting the coarse fraction issuing from the discharge end of said separating body.

2. Apparatus as defined in claim 1 wherein said separating body is mounted between parallel side plates and wherein at least one of said plates has an opening formed therein for communicating the interior space defined by said separating body and said plates to the atmosphere.

3. Apparatus as defined in claim 2 wherein a partition is mounted between said supplying means and said coarse fraction collecting means, said partition extending inwardly into the space defined by said separating body for directing the coarse fraction into said coarse fraction collecting means.

4. Apparatus as defined in claim 1 wherein said separating body includes a plurality of parallel transversely extending bars having flat surfaces defining said separating surface.

References Cited in the file of this patent

UNITED STATES PATENTS

| | | |
|---|---|---|
| 526,334 | Volm | Sept. 18, 1894 |
| 811,930 | Kihlgren | Feb. 6, 1906 |
| 911,469 | Boyd | Feb. 2, 1909 |
| 2,219,453 | Mosley | Oct. 29, 1940 |
| 2,799,394 | Boogaard | July 16, 1957 |

FOREIGN PATENTS

| | | |
|---|---|---|
| 515,859 | Belgium | Dec. 15, 1952 |
| 523,268 | Belgium | Oct. 31, 1953 |